(12) United States Patent
Gulchenko

(10) Patent No.: US 11,195,168 B2
(45) Date of Patent: Dec. 7, 2021

(54) ONLINE TRANSACTION SYSTEM

(71) Applicant: SQWIN SA

(72) Inventor: Victor Gulchenko, Frankfurt (DE)

(73) Assignee: SQWIN SA, Auvernier (CH)

( * ) Notice: Subject to any disclaimer, the term of this patent is extended or adjusted under 35 U.S.C. 154(b) by 22 days.

(21) Appl. No.: 16/056,920

(22) Filed: Aug. 7, 2018

(65) Prior Publication Data

US 2018/0341944 A1 Nov. 29, 2018

Related U.S. Application Data

(63) Continuation of application No. 14/653,521, filed as application No. PCT/EP2013/075461 on Dec. 4, 2013, now Pat. No. 10,043,176.

(30) Foreign Application Priority Data

Dec. 21, 2012 (DE) .................... 10 2012 112 967.3

(51) Int. Cl.
| | | |
|---|---|---|
| *G06Q 20/20* | (2012.01) | |
| *G06Q 20/32* | (2012.01) | |
| *G06Q 20/40* | (2012.01) | |
| *G06Q 20/34* | (2012.01) | |
| *G06F 21/42* | (2013.01) | |
| *G06Q 20/38* | (2012.01) | |
| *G06Q 20/42* | (2012.01) | |

(52) U.S. Cl.
CPC ........... *G06Q 20/347* (2013.01); *G06F 21/42* (2013.01); *G06Q 20/20* (2013.01); *G06Q 20/32* (2013.01);
(Continued)

(58) Field of Classification Search
USPC .............................................. 705/17, 18, 44
See application file for complete search history.

(56) References Cited

U.S. PATENT DOCUMENTS

| | | |
|---|---|---|
| 8,326,759 B2 | 12/2012 | Hammad |
| 2006/0069916 A1 | 3/2006 | Jenisch |

(Continued)

FOREIGN PATENT DOCUMENTS

| | | |
|---|---|---|
| WO | 2006008559 A2 | 1/2006 |
| WO | 2007026212 A1 | 3/2007 |
| WO | 2008050132 A2 | 5/2008 |

OTHER PUBLICATIONS

Office Action for corresponding Indian Patent Application No. 6354/DELNP/2015 dated Aug. 4, 2020 and its English translation.

(Continued)

*Primary Examiner* — Peter Ludwig
*Assistant Examiner* — Reva R Moore
(74) *Attorney, Agent, or Firm* — Renner, Otto, Boisselle & Sklar, LLP

(57) ABSTRACT

A financial transaction may include utilizing a POS system to generate a unique one-time digital code that identifies the financial transaction, forwarding the unique digital code and a store identifying code that identifies the specific POS system, generating transaction data, transmitting the transaction data, the unique digital code, the store identifying code, and account information associated with the POS system from the POS system to a payment system via a first digital network path, transmitting the unique digital code, the store identifying code, and account information associated with a user of the mobile device from the mobile device to the payment system via a second digital network path, and determining whether the unique digital code and store identifying code transmitted via the first digital network path match the unique digital code and store identifying code transmitted via the second digital network path.

34 Claims, 4 Drawing Sheets

(52) U.S. Cl.
CPC ....... *G06Q 20/327* (2013.01); *G06Q 20/3276* (2013.01); *G06Q 20/3278* (2013.01); *G06Q 20/385* (2013.01); *G06Q 20/40* (2013.01); *G06Q 20/425* (2013.01)

(56) References Cited

U.S. PATENT DOCUMENTS

| | | |
|---|---|---|
| 2008/0077527 A1 | 3/2008 | Choe |
| 2009/0288012 A1 | 11/2009 | Hertel et al. |
| 2010/0223145 A1 | 9/2010 | Dragt |
| 2010/0274721 A1 | 10/2010 | Hammad |
| 2011/0028160 A1 | 2/2011 | Roeding |
| 2011/0078031 A1* | 3/2011 | Mardikar ............. G06Q 20/202 705/17 |
| 2013/0091059 A1* | 4/2013 | Stals ...................... G06Q 20/20 705/44 |
| 2013/0268378 A1* | 10/2013 | Yovin .................. G06Q 20/204 705/18 |
| 2015/0348013 A1 | 12/2015 | Gulchenko |

OTHER PUBLICATIONS

German Search Report dated Jun. 17, 2013.
International Search Report dated Feb. 26, 2014.
Chinese Office Action dated Sep. 19, 2018 for the corresponding Chinese Patent Application No. 201380067141.9.

\* cited by examiner

ONLINE TRANSACTION SYSTEM

BACKGROUND

1. Field of the Invention

The invention relates to an online transaction system.

2. Description of the Related Art

A financial transaction system is a computer-aided application system with which predominantly cashless transactions are performed. As a rule, these systems are based on database systems with which transactions are executed. There are safeguards to ensure that a database always has the correct status for the proper implementation of a transaction. For mobile payments or monetary transactions, it is important to establish the identity of the party making the payment and to avoid unauthorised use. WO 2008/050132 A2 discloses a method with which the transaction data are transferred in parallel by a mobile device and a point of sale (POS) system and only executed when both sets of data are identical.

WO 2010/129357 A2 discloses a method for providing dynamic card verification for mobile terminals.

SUMMARY OF THE INVENTION

The principle of the present invention is the separation of the information flows from the purchaser and vendor at the time of the purchase. Each party sends its information package to the payment system via its communication channel. Therefore, on each purchase, two independent information packages are sent to the payment system. Thereby the purchasers pay without releasing their personal payment credentials.

Here, each information package contains an obligatory element—a unique one-time number on the sales receipt (hereinafter—"a unique one-time digital code" or "sales receipt" or "unique identifier"). Only this element enables the payment system or the bank system to identify two information packages and link them with each other.

This approach can be used both in real transactions, with POS systems, and in internet transactions.

The invention comprises a method for performing a digital transaction via a mobile device using a POS system. Hereby, the method the following steps:
  generation of a unique one-time digital code by the utilizing of the POS system (or by the utilizing of the mobile device of the customer), which identifies the transaction;
  transmission of the transaction data with the unique one-time digital code to a bank of the owner of the POS system via a first digital network path;
  parallel transmission of the unique one-time digital code and the account information released by the mobile device to the bank via a second digital network path;
  merging by the bank (or by the payment system/transaction network) of the transaction data from the POS system and the account information released by the mobile device and clearance for the transaction if the merging is successful. Merging is always successful if the codes match. In this way a bank is notified of approval for the transaction via different paths, which are merged at the bank.

To ensure that the bank recognises the account data, the account data are, for example, stored in an internet service such as an email account or an account in a social network and, by logging on to this internet service, the mobile device can release a transmission of the account data and the digital code. In this case, the code can be entered manually or automatically into the device, as will be explained below. By the term "transaction network" is meant either web-based social network service, or web-based email service, or instant messaging service, or mobile payment (digital wallet) service, online store. Payment systems comprise traditional systems like VISA® or MasterCard® or alternative transaction networks. A mobile device can be a smartphone, digital watch, tablet, digital bracelet, digital ring, or digital key fob, or RFID sticker.

The unique transaction identifier (unique one-time digital code) can also be entered via a pattern password (pattern lock), depicted on the POS device or on the sales receipt. Voice input is also conceivable. Automatic transmission by NFC during the connection with the POS device is described below. In an alternative embodiment, the unique transaction identifier is also generated as a one-dimensional or two-dimensional (matrix) barcode which can then be read by an application in the mobile device. This barcode can, as a rule, be detected via the camera of the mobile device.

In an alternative embodiment, the unique one-time digital code can additionally be used once for connection to a wireless network associated with the POS system, wherein, due to the connection, a mobile identifying code (that identifies the mobile device and the specific user) is requested which is incorporated in the transaction data, wherein the mobile device transmits the mobile identifying code to the bank (or by the payment system/transaction network) in parallel and clearance is only provided for a transaction if the mobile identifying code also match. This means that not only the unique one-time digital code but also the mobile identifying number of the mobile device of the customer is checked. In an alternative embodiment, the mobile identifying code is actually the code. It could be not only mobile identifying code of the mobile device, but any other unique identification number of the mobile device of the customer (or of the payment application of the mobile device of the customer).

In an alternative embodiment, the unique one-time digital code is printed out on a receipt by the POS system so that this can then be manually keyed in the mobile device. Alternatively, the code can also be sent to the mobile device via a network associated with the POS system. In this case, the unique one-time digital code is sent via a wireless connection from the POS system to the mobile device, preferably by NFC or Bluetooth or WLAN so that the mobile device can forward the data without manual keying-in.

In an alternative embodiment, the network service includes a specialized mobile payment service (an online financial service)—wherein a mobile payment service is a technological solution of the retail merchant who operates the POS system, wherein the step of transmitting the transaction data, the unique digital code, the mobile identifying code, the identifying code that identifies the POS system, and account information associated with the POS system from the POS system to the payment system further comprises the steps of:
  transmitting the transaction data, the unique digital code, the mobile identifying code, the identifying code that identifies the POS system, and the account information associated with the POS system from the POS system of the retail merchant to the mobile payment service associated with the retail merchant;

determining, by the mobile payment service associated with the retail merchant, whether the unique digital code, mobile identifying code, and the identifying code that identifies the POS system transmitted from the POS system via the first digital network path match the unique digital code, mobile identifying code, and the identifying code that identifies the POS system transmitted by the mobile device via the second digital network path;

forwarding the transaction data, the account information associated with a user of the mobile device, and account information associated with the POS system from the mobile payment service to the payment system with assistance from the acquiring bank of the retail merchant; and offering clearance of the financial transaction by the payment system.

In an alternative embodiment, an inquiry to a telephone service provider enables the position coordinates of the mobile device and the actual geographic position of the POS system to be compared and if the coordinates do not match, the transaction can be blocked. Hence, the coordinates can be a further comparison criterion in order to merge the data reliably and release the transaction.

Following a successful conclusion of the transaction, access to the wireless network associated with the POS system is automatically disconnected.

In a further embodiment, the invention comprises a system, comprising a mobile device, a POS system and a bank system, characterised by a mechanism that implements the method according to one or more of the preceding claims.

In addition, with respect to the internet, the invention relates to a method for performing a digital transaction via a mobile device using a POS system connected to a wireless network associated with the POS system comprising the following steps:

utilizing the POS system to generate a unique one-time digital code that identifies the financial transaction;

communicating the unique digital code from the POS system to the mobile device;

connecting the mobile device to a wireless network associated with the POS system, wherein in one possible embodiment the mobile device uses the unique digital code as a password to connect to the wireless network, in this case the unique digital code is a one-time code that serves as a one-time password;

forwarding, from the mobile device to the wireless network, a mobile identifying code that identifies the mobile device and the specific user;

forwarding, from the wireless network to the mobile device, a network identifying code that identifies the wireless network and the specific POS system of the specific store;

generating transaction data associated with information regarding the financial transaction;

transmitting the transaction data, the unique digital code, the mobile identifying code, the network identifying code, and account information associated with the POS system from the POS system to a payment system via a first digital network path;

transmitting in parallel the unique digital code, the mobile identifying code, the network identifying code, and account information associated with a user of the mobile device from the mobile device to the payment system via a second digital network path;

determining, by the payment system, whether the unique digital code, mobile identifying code, and network identifying code transmitted from the POS system via the first digital network path match the unique digital code, mobile identifying code, and network identifying code transmitted by the mobile device via the second digital network path; and offering clearance of the financial transaction by the payment system when the codes transmitted from the POS system match the codes transmitted by the mobile device.

The wireless network is associated with the POS system of the specific store. In an alternative embodiment, the POS system uses a user account to manage the assignment of the identity of the mobile device to a customer account in that the bank information, such as credit card information or account number, bank sort code etc., are stored. The effect of the assignment of the mobile identifying code (that identifies the mobile device and the specific user) to this transaction information is that the owner of the mobile device does not have to transmit any further account data. The mobile identifying code is used to establish an assignment to the account data and a clearance can be provided. To avoid fraud, data on the mobile provider is also stored with the customer data so that the mobile provider can check whether the device is actually moving in the areas of the location of the cash register and the mobile identifying code has not been stolen. In addition to the mobile identifying code, it is also possible to use other identifiers of the mobile device, as described below. Alternatively, the mobile device account transmits data by means of an application on the mobile device to a destination address in the mobile network. The provider of the mobile network of the mobile device can again use the unique identifier and the account data to check the location of the mobile device and the mobile provider can provide clearance. It should be noted that it is also possible to debit the account of the mobile provider so that the invoicing can take place via the telephone bill.

In an alternative embodiment, the unique digital code is additionally used for one-time connection to the wireless network associated with the POS system (hence, it is a unique code which does not permit access after one single use). In such case the wireless network associated with the POS system can generate a fairly long code (to ensure that no repetitions occur in the case of numerous purchases), but selects either the first or last several symbols as a unique code for entering the wireless network. As soon as the abbreviated code has been entered, the wireless network forwards the complete (long) original unique digital code to the smartphone.

The unique one-time digital code can contain any number of digits or letters. However in an alternative embodiment, with manual input the customer may enter the last several numbers only. The unique code can be generated randomly or can be setup by different elements of the transaction like, amount of money to be paid, seller information, buyer information, individual number of the device of the user, or any other unique identifier of the mobile device and its user. The generation of the unique code can be performed by generating of the unique code by the seller and forwarding it to the buyer, or the unique code is generated by the smartphone or a mobile watch or another mobile device and is forwarded to the seller.

The unique one-time digital code can be transmitted in various forms. The unique one-time digital code can be printed out on a receipt by the POS system so that this can then be manually keyed into a mobile device. In an alternative embodiment, it is also generated as a barcode which can then be read by an application in the mobile device. This barcode can, as a rule, be detected via the camera of the mobile device. In an alternative embodiment, the receipt can also be transmitted to the mobile device via a mobile radio interface by Bluetooth, NFC or as an SMS. If a special application is installed on the mobile device, this unique one-time digital code can be interpreted in the same way and used for the transaction authorisation in the wireless network associated with the POS system. Preferably, the user still has to confirm the entry into the mobile application before access to the wireless network or before the wireless network is enabled.

After communicating the unique digital code between the POS system and the mobile device, both participants of the transaction send their information packages using two different information flows.

In the first information flow, the POS system sends an information package (containing the purchaser's mobile identifying code, the payment amount, the unique one-time digital code, vendor's own information) to the payment system/transaction network with assistance from the acquiring bank of the retail merchant.

In parallel, in the second information flow, the smartphone sends the unique one-time digital code to the application provider (web-based social network service, or web-based email service, or instant messaging service, or mobile payment (digital wallet) service). The application adds the purchaser's payment credentials (credit card credentials or bank credentials) to the information package and sends it to the payment system (transaction network) via its mobile network using GSM/GPRS connection. The payment system (transaction network) compares the two information packages. The vendor receives a commitment from the payment system (transaction network). The customer's bank receives a commitment from the payment system (transaction network).

In the case of non-manual code entry, automatic entry by NFC technology is possible. Transferring data via NFC between the POS system and the mobile device of the customer in this case includes but not limited to the following elements:

the unique transaction identifier (unique one-time digital code),
the identifying code that identifies the POS system (if the unique one-time digital code is generated by the utilizing of the POS system),
the mobile identifying code that identifies the mobile device and the specific user (if the unique one-time digital code is generated by the utilizing of the mobile device of the customer).

In one possible embodiment, to achieve access to the wireless network associated with the POS system, the POS system is connected to a control system for the mobile network in order to exchange the digital code. For example, the control system can control access points for the cableless network via the RADIUS protocol. If a user is to log-in to the cableless network, corresponding requests can be put to the control system from the cableless network's access point. Obviously, other technologies are conceivable. However, in principle, a standard should be used to control the cableless access points so that the unique password is used effectively. When a log-in has been performed and the necessary data have been exchanged, the control system immediately resets the access.

In one possible embodiment, as described above, an application runs on the mobile device via which the unique one-time digital code is entered and a log-in to the mobile network takes place and wherein, after the log-in, account information, credit-card information or the mobile identifying code (that identifies the mobile device and the specific user) are transmitted to the mobile network from the application in order to conclude a transaction. In order to communicate the information to the correct place in the network, during the mobile device log-in, an address is transmitted, (for example via the DHCP protocol) to which the relevant identification data of the mobile device are to be transmitted. This makes it possible also to transmit account information and further details. On log-in to the mobile network, a network address is notified to the mobile device to which the account information, credit-card information or the mobile identifying code (that identifies the mobile device and the specific user) is to be transmitted. When this information has been obtained, this information is as a rule only transmitted on the basis of an approval. It is also possible to request certificates and similar details in order to ensure that only trusted entities receive this information.

In an alternative embodiment, the control system for the mobile network addresses the mobile device after the log-in via the network in order to obtain information for the performance of a digital transaction by the mobile device. Thereupon, the network's control system identifies the mobile device at the time of its connection (by the mobile identifying code or any other unique identification number of the mobile device that identifies the mobile device and the specific user) and forwards the data to the wireless network associated with the POS system.

If a customer account exists with the company, the POS system uses the network identification to access a database in which the account information and/or a network provider is stored in relation to the network identification.

As described above, the transaction data and/or the identification by the POS system enables access data to be transmitted by a telephone service provider via a telephone network to the mobile device, wherein the telephone service provider checks the correctness of the identification. For this, the telephone service provider checks the mobile identifying code (that identifies the mobile device and the specific user). Preferably, the telephone service provider checks the position coordinates of the mobile device and the actual geographic position of the POS system in that he compares them and, if the coordinates do not match, the transaction can be blocked or a corresponding warning message sent to the POS system.

If it should be found that both the transaction data and the position coordinates are correct, the transaction data are transmitted to a corresponding clearing house (the payment system/transaction network), which ultimately performs the transaction on the bank systems.

Following a successful conclusion of the transaction, access to the wireless network is automatically disconnected.

DETAILED DESCRIPTION

The idea is based on the separation of the information flows from the purchaser and vendor at the time of the purchase. Each party sends its information package to the payment system via its communication channel. Therefore, two independent information packages are sent to the payment system with each purchase.

In this case, each information package contains an obligatory element—a unique one-time number of the sales receipt. Only this element enables the payment system to find two information packages and link them to each other.

Figure 1:
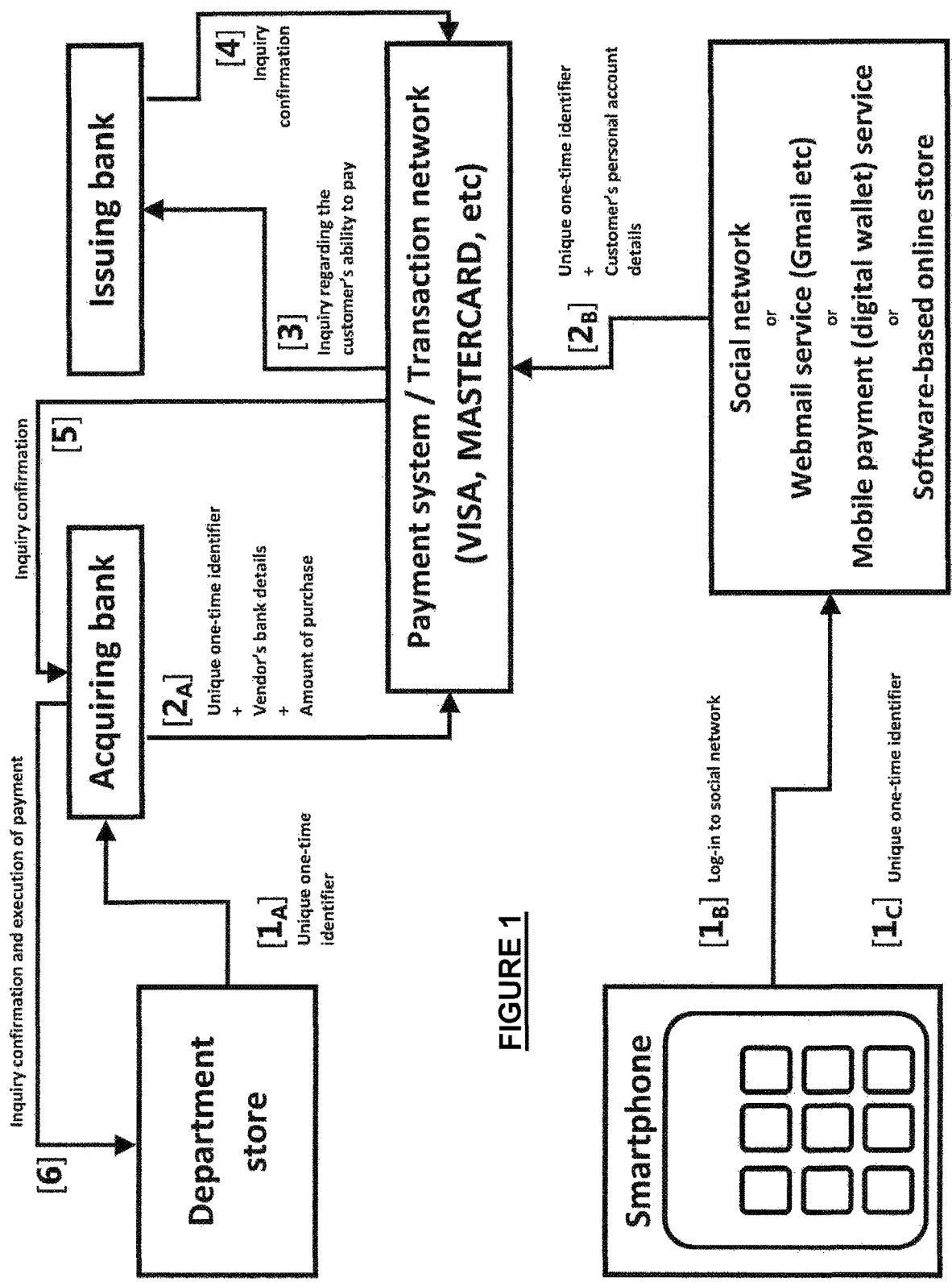
FIG. 1 is a schematic diagram of the course of a possible embodiment of the method without a wireless network associated with the POS system.

FIG. 1 is a schematic diagram of the course of a method with which no local wireless network is used and payment takes place in the internet.

The basic element is that the purchaser is a user of the web-based social network service, or web-based email service, or instant messaging service, or mobile payment (digital wallet) service, or online store—in that he has specified his payment details (personal payment credentials). This achieves a single transmission of information on the payment from the purchaser and vendor. In this case, a unique one-time number of the sales receipt is used to facilitate the connection.

According to FIG. 1, the following is performed in Step 1A.

A unique one-time number of the sales receipt is generated by the online handler (or, alternatively, by the purchaser).

The online handler sends a unique one-time number of the sales receipt to the payment system/transaction network (together with the amount of the payment and its own bank details) (1A).

In parallel to this, the purchaser logs-in to his application (web-based social network service, or web-based email service, or instant messaging service, or mobile payment (digital wallet) service, or online store) or has already logged-in (1B).

The purchaser sends the unique one-time number of the sales receipt to the web-based social network service, or web-based email service, or instant messaging service, or mobile payment (digital wallet) service, or online store (IC). The purchaser's application (web-based social network service, or web-based email service, or instant messaging service, or mobile payment (digital wallet) service, or online store) sends this the unique one-time number of the sales receipt with the personal purchaser data to the payment system (2B). The payment system receives two information packages with the same unique one-time number of the sales receipt and combines them for the processing (2A). The payment system then checks the customer's ability to pay (3) with the card-issuing bank and if appropriate receives an inquiry confirmation (4). The payment system then sends an inquiry confirmation (5) to the acquiring bank, which is then forwarded again to the department store (6) or the POS system which release the information for the payment.

Figure 2:
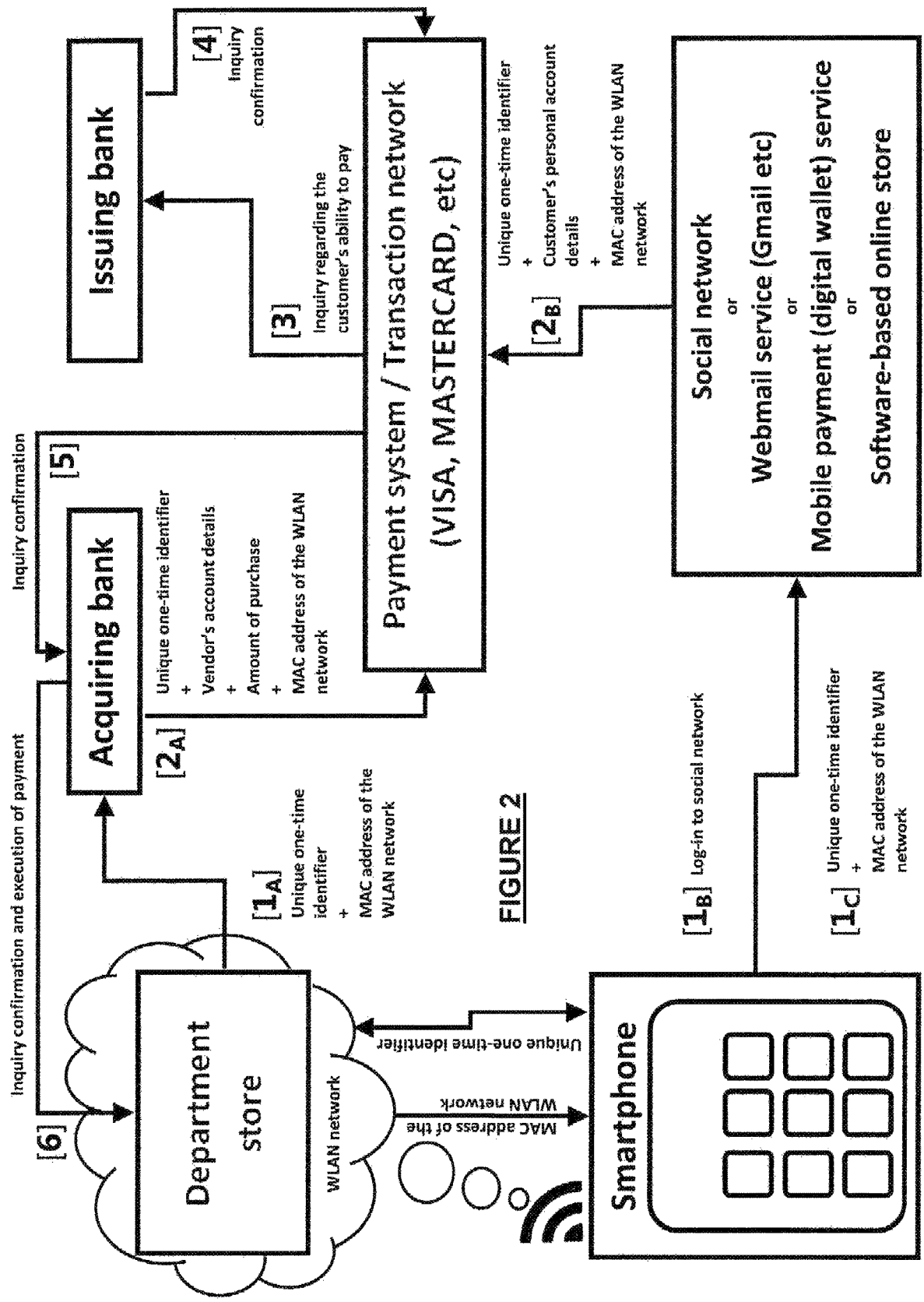
FIG. 2 is a schematic diagram of the course of a possible embodiment of the method with a wireless network associated with the POS system.

In FIG. 2, the basic elements are that the purchaser is a user of the web-based social network service, or web-based email service, or instant messaging service, or mobile payment (digital wallet) service, or online store to which he has given his personal payment details. A single split transmission of information on the payment from purchaser and vendor takes place. The unique one-time number of the sales receipt is used to facilitate connection between two information packages. Besides, the identifying code that identifies the POS system of the vendor (department store, café, multi-storey car park etc) is used to facilitate the connection between two information packages. In principle, the handling sequence is similar to that in FIG. 1, but here each information package contains an identifying code that identifies the POS system of the vendor.

In addition to the unique one-time number of the sales receipt, the identifying code (that identifies the POS system of the vendor) can be used to merge both information packages by the payment system. The purchaser logs-in the wireless network associated with the POS system of the vendor using his smartphone in order to accept his purchase (transaction).

The smartphone receives information on the identifying code that identifies the POS system of the vendor, which is also sent to the payment system/transaction network.

The vendor's POS system receives a signal relating to the desired purchase and sends the data to the payment system/transaction network via its acquiring bank (1A).

The further steps correspond to FIG. 1 wherein additionally the identifying code (that identifies the POS system of the vendor) is compared.

FIG. 3 again shows a modified version. Once again, the basic elements are that the purchaser is a user of the web-based social network service, or web-based email service, or instant messaging service, or mobile payment (digital wallet) service, or online store where he has specified his personal payment details. A single split transmission of information on the payment of the purchaser and vendor takes place. The use of the unique one-time number of the sales receipt as a connection possibility between two information packages is merged using the identifying code that identifies the POS system of the vendor (department store, café, multi-storey car park etc) and using the mobile identifying code (that identifies the mobile device and the specific user). This causes 3 parameters to be compared.

The handling sequence is the same as with variants in FIGS. 1 and 2, but here each information package also contains the mobile identifying code (that identifies the mobile device and the specific user).

In addition to the unique one-time number of the sales receipt, this mobile identifying code is used for the merging on the part of the payment system.

The purchaser logs-in the wireless network associated with the POS system of the vendor using his smartphone in order to accept his purchase (transaction).

The vendor's wireless network associated with the POS system receives both components—the mobile identifying code (that identifies the mobile device and the specific user) and the identifying code that identifies the POS system of the vendor. Then each party (the POS system and the mobile device of the customer) sends these identifiers together with the complete information package to the payment system/transaction network. (1) (2) (3)

In this case, both identifiers are additional components in the search for two information packages sent to the payment system (transaction network) during the course of a purchase.

Figure 3:
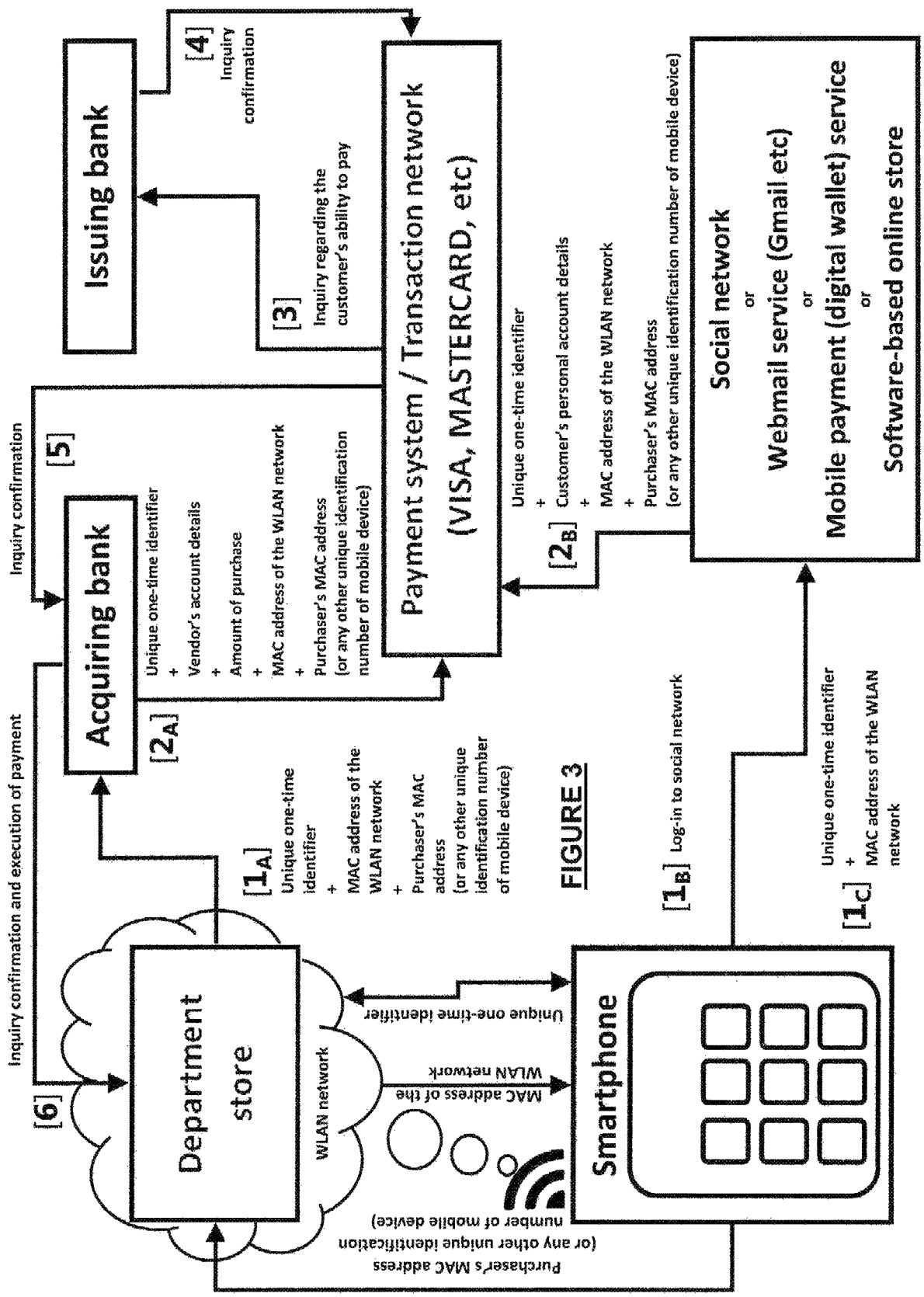
FIG. 3 is a schematic diagram of the course of a possible embodiment of the method with a wireless network associated with the POS system and two additional identifiers of a transaction.

FIGS. 2 and 3 are schematic diagrams of the course of the present method. In a first step, a POS system generates a sales slip for a transaction with a unique one-time identifier. When the mobile device has logged-in with one of the possible application (web-based social network service, or web-based email service, or instant messaging service, or mobile payment (digital wallet) service, or online store), the POS system receives the corresponding information on the log-in from the access system (which is not shown). The POS system then asks the department store's acquiring bank (payment system/transaction network) whether an account is linked to the identification of the mobile device on which the corresponding bank details of the customer are stored. In the event that the identification of the mobile device also matches the location, which was requested from the telephone service provider, additional data are available. If the telephone service provider establishes that the location and identification of the mobile device match and there is no unauthorised use, feedback is sent to the payment system. The server system in turn notifies the store's bank of this in order to ensure that there is no unauthorised use. When these details have been exchanged, the payment system concludes the transaction via the issuing bank. When this has taken place, a remittance is transmitted to the department store. The POS system is also informed of the successful conclusion of the transaction.

Figure 4:
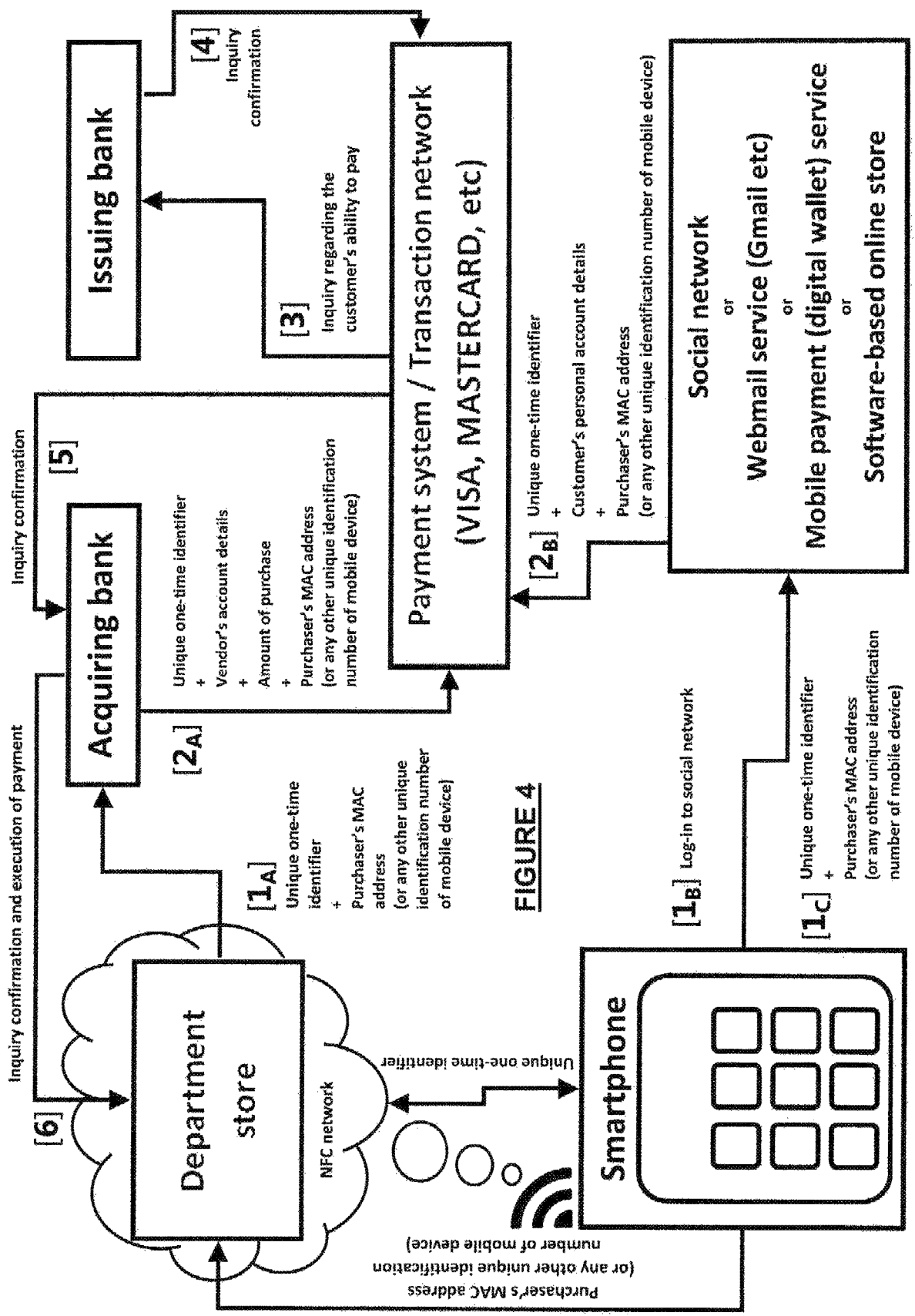
FIG. 4 is a schematic diagram of the course of a possible embodiment of the method, wherein the identification is entered on the mobile device not manually, but via NFC.

FIG. 4 additionally shows that the unique one-time number of the sales receipt is transmitted between the smartphone and the POS system via a NFC connection. The transaction data gets sent to the payment system/transaction network, which then in turn forward the data to the bank for clearing. In parallel, the data is also transmitted from the department store to payment system/transaction network with assistance of its acquiring bank.

In this case the transaction data includes but not limited to the following elements:
- the unique transaction identifier (unique one-time digital code),
- the identifying code that identifies the POS system (if the unique one-time digital code is generated by the utilizing of the POS system),
- the mobile identifying code that identifies the mobile device and the specific user (if the unique one-time digital code is generated by the utilizing of the mobile device of the customer).

The invention claimed is:

1. A method for performing a financial transaction via a mobile device and a point-of-sale (POS) system, the method comprising the steps of:
   obtaining a unique one-time digital code that identifies the financial transaction;
   communicating, from the POS system to the mobile device, the unique digital code, wherein the mobile device connects to a network using the unique digital code, the unique digital code is a one-time password that identifies the financial transaction when connecting to the network;
   generating by the POS system transaction data associated with information regarding the financial transaction;
   transmitting the transaction data, the unique digital code, and information associated with the POS system from the POS system a first digital network path;
   transmitting the unique digital code and account information associated with a user of the mobile device from the mobile device via a second digital network path;
   receiving an indication as to whether the unique digital code transmitted from the POS system via the first digital network path match the unique digital code transmitted by the mobile device via the second digital network path; and
   offering clearance of the financial transaction when the code transmitted from the POS system match the code transmitted by the mobile device.

2. The method of claim 1, wherein the step of communicating the unique digital code between the POS system and the mobile device further comprises:
   utilizing the mobile device to generate the unique one-time digital code that identifies the financial transaction;
   forwarding, from the mobile device to the POS system, the unique digital code and a mobile identifying code that identifies the mobile device and the specific user;
   generating by the POS system transaction data associated with information regarding the financial transaction;
   transmitting the transaction data, the unique digital code, the mobile identifying code and account information associated with the POS system from the POS system to a payment system via the first digital network path;
   transmitting in parallel the unique digital code, the mobile identifying code and account information associated with the user of the mobile device from the mobile device to the payment system via the second digital network path;
   determining, by the payment system, whether the unique digital code and mobile identifying code transmitted from the POS system via the first digital network path match the unique digital code and mobile identifying code, transmitted by the mobile device via the second digital network path; and
   offering clearance of the financial transaction by the payment system when the codes transmitted from the POS system match the codes transmitted by the mobile device.

3. The method of claim 2, wherein the step of communicating the unique digital code from the mobile device to the POS system further comprises transmitting the unique digital code via near field communication (NFC), short message service (SMS), Wi-Fi, or Bluetooth.

4. The method of claim 2, wherein the step of communicating the unique digital code from the mobile device to the POS system further comprises:
   utilizing the mobile device to display a barcode that encodes the unique digital code; and
   utilizing the POS system to capture an image of the barcode.

5. The method of claim 1, wherein the step of communicating the unique digital code from the POS system to the mobile device further comprises:
   utilizing the POS system to print out the unique digital code on a receipt;
   and
   allowing a user of the mobile device to manually enter the unique digital code in the mobile device.

6. The method of claim 1, wherein the step of communicating the unique digital code from the POS system to the mobile device further comprises transmitting the unique digital code via near field communication (NFC), short message service (SMS), Wi-Fi, or Bluetooth.

7. The method of claim 1, wherein the step of communicating the unique digital code from the POS system to the mobile device further comprises:
   utilizing the POS system to display a barcode that encodes the unique digital code; and
   utilizing the mobile device to capture an image of the barcode.

8. The method of claim 7, wherein in the process of transferring the unique digital code from the POS system to the mobile device via a barcode capture an additional information is used, such as identifying code that identifies the POS system; thereby the barcode is an information package of unique digital code that identifies the financial transaction, and the identifying code that identifies the POS system.

9. The method of claim 8, wherein a mobile payment service is a technological solution of the retail merchant who operates the POS system, wherein the step of transmitting the transaction data, the unique digital code, the mobile identifying code, the identifying code that identifies the POS system, and account information associated with the POS system from the POS system further comprises the steps of:
- transmitting the transaction data, the unique digital code, the identifying code that identifies the POS system, and the account information associated with the POS system from the POS system of the retail merchant to the mobile payment service associated with the retail merchant;
- determining, by the mobile payment service associated with the retail merchant, whether the unique digital code and the identifying code that identifies the POS system transmitted from the POS system via the first digital network path match the unique digital code and the identifying code that identifies the POS system transmitted by the mobile device via the second digital network path;
- forwarding the transaction data, the account information associated with a user of the mobile device, and account information associated with the POS system from the mobile payment service to a payment system; and
- offering clearance of the financial transaction by the payment system.

10. The method of claim 7, wherein in the process of transferring the unique digital code from the POS system to the mobile device via a barcode capture an additional information is used, such as mobile identifying code that identifies the mobile device and the specific user; thereby the barcode is an information package of unique digital code that identifies the financial transaction, and the mobile identifying code that identifies the mobile device and the specific user.

11. The method of claim 1, wherein the step of transmitting the transaction data, the unique digital code, and the information associated with the POS system from the POS system includes the steps of:
- transmitting the transaction data, the unique digital code, and the information associated with the POS system to a payment system.

12. The method of claim 1, wherein the step of transmitting the unique digital code and the account information associated with the user of the mobile device includes transmitting the unique digital code and the account information associated with the user of the mobile device to a network service,
the method further comprising:
- forwarding the unique digital code and the account information associated with the user of the mobile device from the network service to a payment system.

13. The method of claim 12, wherein the network service includes one of a social network service, an electronic mail service, a mobile payment service, and an online financial service.

14. The method of claim 13, wherein the mobile payment service is a technological solution of the retail merchant who operates the POS system, wherein the step of transmitting the transaction data, the unique digital code, and the information associated with the POS system from the POS system further comprises the steps of:
- transmitting the transaction data, the unique digital code, and the information associated with the POS system from the POS system of the retail merchant to the mobile payment service associated with the retail merchant;
- determining, by the mobile payment service associated with the retail merchant, whether the unique digital code transmitted from the POS system via the first digital network path match the unique digital code transmitted by the mobile device via the second digital network path;
- forwarding the transaction data to the payment system; and
- offering clearance of the financial transaction by the payment system.

15. The method of claim 13, further comprising the steps of:
- utilizing a mobile payment service that provides an additional location sensitive feature for the user of the mobile device to obtain position coordinates of the mobile device when a mobile payment service application is activated manually by the user of the mobile device;
- recognition of either position coordinates or the specific store by a mobile payment service automatically when it is activated;
- comparing the position coordinates with a geographical position of the POS system;
- blocking the financial transaction if the position coordinates of the mobile device do not match the geographical position of the POS system; and
- authorizing the financial transaction if the position coordinates of the mobile device match the geographical position of the POS system.

16. The method of claim 13, wherein the network service is configured to store the account information associated with the user of the mobile device.

17. The method of claim 13, wherein the payment system is associated with at least one of an issuing bank, a credit card association, and a financial transaction network.

18. The method of claim 1, further comprising the steps of:
- utilizing a telephone service provider that provides service for the user of the mobile device to obtain position coordinates of the mobile device;
- comparing the position coordinates with a geographical position of the POS system;
- blocking the financial transaction if the position coordinates of the mobile device do not match the geographical position of the POS system; and
- authorizing the financial transaction if the position coordinates of the mobile device match the geographical position of the POS system.

19. The method of claim 1, further comprising the steps of:
- utilizing a mobile payment service that provides an additional location sensitive feature for the user of the mobile device to obtain position coordinates of the mobile device when a mobile payment service application is activated manually by the user of the mobile device;
- recognition of either position coordinates or the specific store by a mobile payment service automatically when it is activated;
- comparing the position coordinates with a geographical position of the POS system;

blocking the financial transaction if the position coordinates of the mobile device do not match the geographical position of the POS system; and
authorizing the financial transaction if the position coordinates of the mobile device match the geographical position of the POS system.

20. The method of claim 1, further comprising the step of disconnecting a connection between the mobile device and a wireless network at the conclusion of the financial transaction.

21. A system for performing a financial transaction, the system comprising:
a point-of-sale (POS) system configured to obtain a unique one-time digital code that identifies the financial transaction to be conducted with a customer, the POS system further configured to generate transaction data associated with information regarding the financial transaction; and
a mobile device application for a mobile device associated with the customer, the mobile device application configured to receive the unique digital code from the POS system, wherein the mobile device application connects to a network using the unique digital code, the unique digital code is a one-time password that identifies the financial transaction when connecting to the network; and
wherein the POS system is configured to transmit the transaction data, the unique digital code, and information associated with the POS system via a first digital network path;
wherein the mobile device application is configured to transmit the unique digital code, and account information associated with the customer via a second digital network path;
wherein the POS system is configured to receive an indication as to whether the unique digital code transmitted from the POS system via the first digital network path matches the unique digital code transmitted by the mobile device application via the second digital network path and to proceed with the financial transaction when the code transmitted from the POS system matches the code transmitted by the mobile device application.

22. The system of claim 21, wherein the POS system is configured to print out the unique digital code on a receipt to allow the customer to manually enter the unique digital code in the mobile device application.

23. The system of claim 21, wherein the POS system is configured to communicate the unique digital code to the mobile device application by transmitting the unique digital code via near field communication (NFC), short message service (SMS), Wi-Fi, or Bluetooth.

24. The system of claim 21, wherein the POS system is configured to communicate the unique digital code to the mobile device application by displaying a barcode that encodes the unique digital code and allowing the mobile device application to capture an image of the barcode.

25. The system of claim 24, wherein in the process of transferring the unique digital code from the POS system to the mobile device application via a barcode capture an additional information is used, such as identifying code that identifies the POS system; thereby the barcode is an information package of unique digital code that identifies the financial transaction, and the identifying code that identifies the POS system.

26. The system of claim 24, wherein a mobile payment service is a technological solution of a retail merchant who operates the POS system, wherein the step of transmitting the transaction data, the unique digital code, and the information associated with the POS system from the POS system further comprises the steps of:
transmitting the transaction data, the unique digital code, and the information associated with the POS system from the POS system to the mobile payment service associated with the retail merchant;
determining, by the mobile payment service associated with the retail merchant, whether the unique digital code transmitted from the POS system via the first digital network path matches the unique digital code transmitted by the mobile device application via the second digital network path;
forwarding the transaction data, account information associated with a user of the mobile device application, and the information associated with the POS system from the mobile payment service to a payment system; and
offering clearance of the financial transaction by the payment system.

27. The system of claim 26, further utilizing a mobile payment service that provides an additional location sensitive feature for the user of the mobile device application to obtain position coordinates of the mobile device application when a mobile payment service application is activated manually by the user of the mobile device application; and wherein either position coordinates or the specific store are recognized by a mobile payment service automatically when it is activated by the user of the mobile device application; and wherein a mobile payment service is configured to block the financial transaction if the position coordinates of the mobile device application do not match the geographical position of the POS system and to authorize the financial transaction if the position coordinates of the mobile device application match the geographical position of the POS system.

28. The system of claim 21, further comprising an acquiring bank interface, wherein the POS system is configured to transmit the transaction data, the unique digital code, and the information associated with the POS system from the POS system via the acquiring bank interface and the acquiring bank is configured to forward the transaction data, the unique digital code, and the information associated with the POS system to a payment system.

29. The system of claim 21, further comprising a network service, wherein the mobile device application is configured to transmit the unique digital code, and the account information associated with the customer to the network service and the network service is configured to forward the unique digital code, and the account information associated with the customer from the network service to a payment system.

30. The system of claim 29, wherein the network service includes one of a social network service; an electronic mail service, a mobile payment service, and an online financial service, and wherein the network service is configured to store the account information associated with the user of the mobile device application.

31. The system of claim 29, wherein a mobile payment service is a technological solution of the retail merchant who operates the POS system, wherein the step of transmitting the transaction data, the unique digital code, and the information associated with the POS system from the POS system to the payment system further comprises the steps of:
transmitting the transaction data, the unique digital code, and the information associated with the POS system from the POS system of the retail merchant to the mobile payment service associated with the retail merchant;

determining, by the mobile payment service associated with the retail merchant, whether the unique digital code transmitted from the POS system via the first digital network path matches the unique digital code transmitted by the mobile device application via the second digital network path;

forwarding the transaction data, account information associated with a user of the mobile device application, and account information associated with the POS system from the mobile payment service to the payment system.

32. The system of claim 21, further utilizing a mobile payment service that provides an additional location sensitive feature for the user of the mobile device application to obtain position coordinates of the mobile device application when a mobile payment service application is activated manually by the user of the mobile device application; and wherein either position coordinates or the specific store are recognized by a mobile payment service automatically when it is activated by the user of the mobile device application; and wherein a mobile payment service is configured to block the financial transaction if the position coordinates of the mobile device do not match the geographical position of the POS system and to authorize the financial transaction if the position coordinates of the mobile device match the geographical position of the POS system.

33. The system of claim 32, wherein the mobile payment service is associated with at least one of an issuing bank, a credit card association, and a financial transaction network.

34. The system of claim 21, further utilizing a telephone service provider that provides service for the user of the mobile device application, wherein the telephone service provider is configured to obtain position coordinates of the mobile device application and compare the position coordinates with a geographical position of the POS system, and wherein a payment system is configured to block the financial transaction if the position coordinates of the mobile device do not match the geographical position of the POS system and to authorize the financial transaction if the position coordinates of the mobile device match the geographical position of the POS system.

* * * * *